US007596807B2

(12) United States Patent
Ptacek et al.

(10) Patent No.: US 7,596,807 B2
(45) Date of Patent: Sep. 29, 2009

(54) METHOD AND SYSTEM FOR REDUCING SCOPE OF SELF-PROPAGATING ATTACK CODE IN NETWORK

(75) Inventors: Thomas Henry Ptacek, Ann Arbor, MI (US); Douglas Joon Song, Ann Arbor, MI (US); Jose Oscar Nazario, Dexter, MI (US)

(73) Assignee: Arbor Networks, Inc., Chelmsford, MA (US)

( * ) Notice: Subject to any disclaimer, the term of this patent is extended or adjusted under 35 U.S.C. 154(b) by 894 days.

(21) Appl. No.: 10/684,964

(22) Filed: Oct. 14, 2003

(65) Prior Publication Data

US 2005/0005017 A1 Jan. 6, 2005

Related U.S. Application Data

(60) Provisional application No. 60/484,873, filed on Jul. 3, 2003.

(51) Int. Cl.
*H04L 29/06* (2006.01)
*G06F 21/00* (2006.01)
(52) U.S. Cl. .......................................... 726/11; 726/23
(58) Field of Classification Search ................ 726/22, 726/13, 11
See application file for complete search history.

(56) References Cited

U.S. PATENT DOCUMENTS

| 5,621,889 | A | * | 4/1997 | Lermuzeaux et al. | 726/22 |
|---|---|---|---|---|---|
| 6,119,236 | A | * | 9/2000 | Shipley | 726/22 |
| 7,017,186 | B2 | * | 3/2006 | Day | 726/23 |
| 2002/0023227 | A1 | * | 2/2002 | Sheymov et al. | 713/201 |
| 2002/0144156 | A1 | * | 10/2002 | Copeland, III | 713/201 |
| 2003/0005334 | A1 | | 1/2003 | Wesinger, Jr. et al. | |
| 2003/0120955 | A1 | | 6/2003 | Bartal et al. | |
| 2003/0149888 | A1 | * | 8/2003 | Yadav | 713/200 |
| 2004/0015719 | A1 | * | 1/2004 | Lee et al. | 713/201 |
| 2004/0103211 | A1 | * | 5/2004 | Jackson et al. | 709/244 |

FOREIGN PATENT DOCUMENTS

WO   WO 02/061510 A2   8/2002

OTHER PUBLICATIONS

Agnitum, "Outpost Firewall, User Guide Reference," Online URL: http://web.archive.org/web/20031015041810/agnitum.net/download/Outpost_User_Guide_(ENG).pdf>, 2001, pp. 1-98.

(Continued)

*Primary Examiner*—Gilberto Barron, Jr.
*Assistant Examiner*—Cordelia Kane
(74) *Attorney, Agent, or Firm*—Houston Eliseeva, LLP (57) ABSTRACT

Technique for protecting a communications network, such a computer network, from attack such as self-propagating code violations of security policies, in which the network is divided into "compartments" that are separated by access control devices such as firewalls. The access control devices are then used to stop the spread of self-propagating attack code, the "zero-day" worms, for example. However, the access control devices are configured such that upon activation legitimate in-use network services will not be jeopardized.

34 Claims, 6 Drawing Sheets

OTHER PUBLICATIONS

Cunningham, Robert K., "Detecting and Displaying Novel Computer Attacks with Macroscope," IEEE Transections on Systems, Man, and Cybernetic, vol. 31, No. 4, Jul. 2001, pp. 275-281.

Freiss, Martin et al., "Einbrecheralarm Intrusion Detection mit Snort," CT Magazin Fuer Computer Technik, Verlag Heinz Heise GmbH, Hannover, DE, vol. 1, No. 8, Apr. 22, 2001, pp. 212-219.

* cited by examiner

METHOD AND SYSTEM FOR REDUCING SCOPE OF SELF-PROPAGATING ATTACK CODE IN NETWORK

BACKGROUND OF THE INVENTION

Operators of large networks have tools to address the self-propagating attack behavior such as from "network worms", which automatically, opportunistically attack networked computing devices. Often, worms "propagate" themselves across a network faster than humans can intervene to stop them. As a result, a number of systems are available that run on the network communications devices or host computers, such as client or server computers, that can combat this propagation.

Operators also need more robust tools for maintaining the security of networks against other types of attacks and to generally enforce security policies. For example, many host computers perform specified tasks that are critical and other tasks that may be less critical or less common or more susceptible to security breaches. As security policies change or threat levels to the network change access to the host computers should be adapted accordingly.

Currently available Network Intrusion Detection Systems (NIDS) can detect network attacks such as worm outbreaks by comparing all traffic to a database of known worms. The operation is similar to ubiquitous virus checking software that scans received and stored files at client computers. These NIDS are deployed at the edges of enterprise networks to insulate the networks from unauthorized access from third party or public networks, such as the InterNet.

Anomaly Detection Systems (ADS) detect worm outbreaks by observing network behavior and noticing deviations from normal network traffic patterns. Exemplary Anomaly Detection Systems generate a matrix of observed traffic rates. A typical implementation generates a matrix representing the cross product of every host on the network against every other host on the network against every port or protocol on which traffic is observed. When rates exceed a learned or statically assigned traffic rate or, more typically, when traffic is seen on a port for the first time, a typical ADS will generate an alert.

Still another type of system generates a multigraph-based model of the network, where the vertices in the graph represent hosts and edges between hosts represent different protocols on which traffic is observed. A hierarchical clustering algorithm reduces this from a multigraph of hosts on the network to a multigraph of groups of similar hosts. Alerts are generated when traffic between hosts or groups does not match a learned edge between the hosts or groups.

Standard network security practices at large networks also involve firewall devices to block traffic from untrusted, typically all InterNet hosts, on untrusted protocols, which are typically any protocol other than HTTP (hyper text transfer protocol) and SMTP (simple message transfer protocol). In this manner, worm outbreaks are stifled by lack of connectivity from untrusted, infected hosts to vulnerable hosts of the network.

The current state of the art also provides for the blocking of traffic in response to detection of a propagating attack behavior. Here, Network Intrusion Prevention Systems (NIPS) detect worms in the same manner as NIDS systems, but are deployed in the same manner as network firewalls, on the network edges that interface with larger networks, such as the InterNet or service provider networks. When worms are detected, communications through the network involving infected hosts are selectively dropped.

The current state of the art also provides for a simple control plane between a detection system and an access control device. The popular open source "Snort" NIDS includes a plugin, called "snort_sam", that reconfigures firewalls and router access control lists (ACLs) to block traffic corresponding to alerts generated by the Snort NIDS.

SUMMARY OF THE INVENTION

Existing systems, however, have not been a universally successful solution to addressing security problems stemming from threats such as worms or enforcing security policies. One significant reason for this is that enterprise operators do not trust simple security systems from unproven third-party vendors to be the arbiters of what traffic is and is not legitimate or what traffic conforms with established policies, or not, on their networks.

The classic description of "customer pain" in reference to this problem involves a large financial institution, for instance, which may have database servers using a protocol that is vulnerable to a new worm or otherwise. And, even if those servers were to become infected with a worm or hacked, administrators at the institution would still not generally block traffic to or from those servers. The quantifiable loss to the business if the servers are brought down may reach many tens or hundreds of thousands of dollars per second, whereas the quantifiable loss from the behavior of a typical worm or if the servers where hacked is not likely to approach that level. Moreover, even the expected loss from the worm's behavior approached the loss to business of the servers going-down, institutions still do not trust the alerting capabilities of security systems to properly make that decision.

The problem with the existing systems for defending against attacks such as from worms is that there is no mechanism for assuring that blocking actions taken by the firewalls will not block services that are in legitimate use on the network. Thus, an institution choosing to deploy these systems must make tradeoffs between a robust defense against attack and preserving legitimate network communications in the event of an actual or suspected attack. Consequently, some institutions that have mission-critical communications over their networks will make compromises in the effectiveness of the defense that is mounted against an attack in order to ensure that these important communications are not impacted by the attack response.

The present invention is directed to a technique for protecting a communications network, such a computer network, from attack, such as from self-propagating code or other breaches to security policies. The network is divided into "compartments" that are separated by access control devices, such as firewalls. The access control devices are then used to stop the security breach such as the spread of self-propagating attack code, the "zero-day" worms, for example. However, the access control devices are configured such that upon activation, legitimate in-use network services will not be jeopardized.

The invention capitalizes on the insight that much of the problem with zero-day worms and other attacks originates from network resources that are not in normal use. By blocking only traffic that is atypical for a particular network, for instance, database connections between two desktop systems that never normally speak a database protocol, the inventive system is able to generate blocking actions that stifle the majority of attacks such as zero-day worm traffic. At the same time, the system is much less likely to disrupt business processes, since access control devices will still permit network communications that exhibit behavior that are characteristic of normal communication patterns on the network.

In general, according to one aspect, the invention features a system for controlling communications over a computer network. This system comprises access control devices that control communications between compartments of the computer network. An example of an access control device is a firewall or other system that has the ability to selectively forward packets. An attack detection system is further provided, which determines whether the computer network may be under attack. Finally, in response to an attack, a control plane is used to instruct the access control devices to allow network communications between the compartments of the computer network based on a usage model describing legitimate network communications while restricting other network communications between the compartments.

Depending on the implementation, the present invention is applicable to enterprise networks, service provider networks, and/or public networks.

In various embodiments, the access control devices compartmentalize the computer network into separate sub-networks of network devices or are simply used to separate host computers from the computer network.

In the preferred embodiment, a network modeling system is used to generate the usage model in response to flow information describing communications between network devices. This flow information is typically collected by network communications devices and/or the access control devices.

In order to constrain the size of the usage model, the network modeling system discards flow information between network devices in the computer network and network devices external to the computer network. Generally, the network modeling system compares new network communications to the usage model and updates the usage model if the new network communications are not described by the usage model. Entries in the usage model comprise source addresses, destination addresses, source ports, and destination ports derived from the network communications. In some examples, time stamp information is further provided to additionally indicate when the network communication was last detected and frequency information is kept to indicate a frequency of the network communication.

The attack detection system can detect attack using various techniques. For example, it can monitor communications over the computer network for attack using signature detection and/or perform heuristic modeling to determine whether the computer network is under attack.

In the preferred embodiment, the control plane receives protocol information and/or port information characteristic of the attack and generates pass and/or blocking rules for the access control devices. More specifically, the control plane generates pass rules and blocking rules for the access control devices, in which the pass rules are generated from the usage model and the blocking rules are generated from the protocol information and/or port information characteristic of the attack.

In general, according to another aspect, the invention features a method for responding to an attack on a computer network. This method comprises generating a usage model for the computer network and determining whether the computer network may be under attack. In response to detecting attack, characteristics of the attack are determined and instructions generated or issued to access control devices compartmentalizing the computer network in response to the characteristics of the attack.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
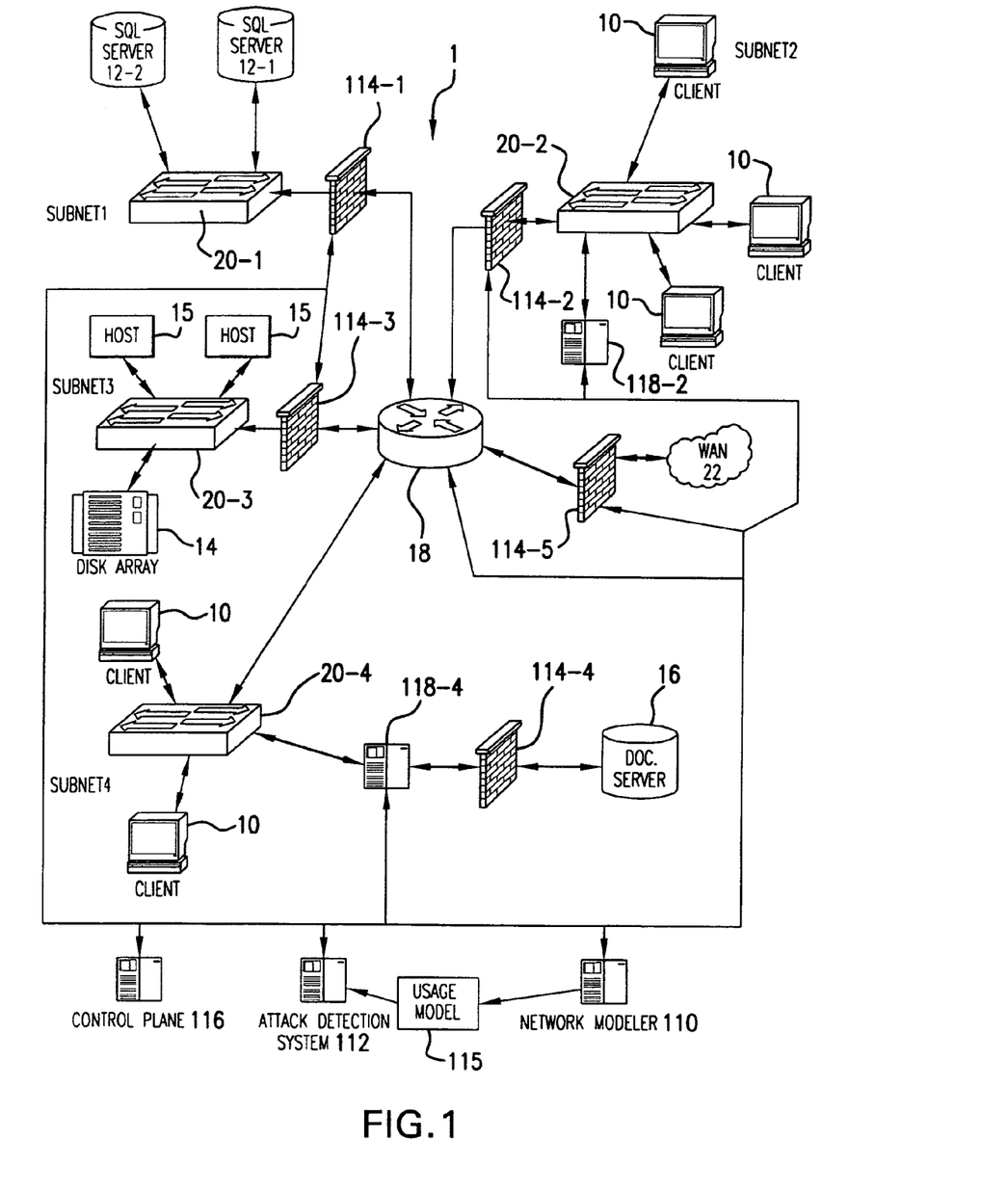
FIG. 1 is a block diagram showing an exemplary computer network including a system for protecting the network from attack, according to the present invention.

FIG. 1 shows a communications network 1 that is constructed according to the principles of the present invention.

In the illustrated example, the communications network 1 is the network for an enterprise such as a large company. This configuration, however, is shown by way of illustration. In other implementations, the present invention is applied to service provider networks that provide communications between enterprise networks and/or individuals, or even public networks.

Generally, the communications network 1 comprises a series of sub-networks (subnet1-subnet4). These subnets typically include groups of network devices or further sub-networks. As characteristic of many enterprise networks, for example, the subnets include different types of networks devices. For example, subnet2 and subnet4 include one or more host computers such as workstations 10, or network client computers. Subnet4 also includes host computers, such as document server 16. Subnet1 and subnet3 include one or more host computers 15, SQL servers 12-1, 12-2, and disk array 14.

Network communications devices interconnect the network devices of the subnets. In the illustrated example, switches 20-1, 20-2, 20-3, and 20-4 provide connectivity between the network devices in subnet1, subnet2, subnet3, and subnet4, respectively, and uplinking to a router 18. The router 18 provides connectivity between the switches 20-1, 20-2, 20-3, 20-4 and external networks such as a wide area network or InterNet 22.

The illustrated network layout is not critical to the invention, but simply illustrates one enterprise configuration in which host computers and client computers are aggregated with each other in order to facilitate administration. Moreover, in the implementation in which the system is applied to a service provider network or public network, the subnets subnet1-subnet4 would correspond, for example, to the networks of different enterprises or corporations.

The inventive network protection, or more generally control, system performs a series of functions that are typically performed by separate hardware devices, but are sometimes performed by common devices. Generally these functions include: 1) measuring and modeling the services or network communication in legitimate use on the network 1, especially during normal operation of the network, or it lifetime; 2) detecting changes in network usage signatures that suggest attack such as self-propagating network behavior; 3) providing access control between different compartments or subnets of the network, and 4) actuating or configuring the access control to specifically block unauthorized behavior such as propagating code. This enables the inventive system to reduce the scope of network attacks, such as self-propagating attack code, in one application or enforce security policies in other applications.

The logical elements of the system include a Network Modeling Mechanism (NMM) 110, which is the system that tracks network usage and models the behavior of network devices on the network 1. An Attack Detection System (ADS) 112 observes network usage and discovers self-propagating network attack behavior. One or more Access Control Devices (ACDs) 114-1, 114-2, 114-4, 114-5 (collectively reference numeral 114) function to compartmentalize the network 1 by forwarding and selectively blocking traffic between compartments or sub-networks of the network 1. A typical example of an ACD is a firewall.

A Control Plane/attack response controller (CP) 116 provides coupling or communication between the NMM 110, ADS 112, and ACDs 114 and also communicates to the ACDs 114 concerning which traffic should be blocked to foil the breach such as self-propagating attack traffic. In one example, this communication between the control plane 116 occurs over the network itself. In other examples, a dedicated network or communications plane is provided.

The NMM 110 is driven by network observations from a variety of network device sources, including direct packet capture, log file analysis (as from firewalls and host logging systems), and network management protocols embedded on routers, switches, and hubs (including SNMP, NetFlow, and RMON).

In one specific example, a monitoring computer 118-4 is used to accumulate information concerning the packets, including protocol and port addresses, being transmitted between document server 16 and switch 20-4 of subnet4. Another monitoring computer 118-2 collects statistics and data concerning the packets sent through the respective switch 20-2. The collected information is transmitted to the NMM 110. Further, firewalls 114-1, 114-2, 114-4, 114-5 communicate directly with the NMM 110 as does router 18, in the illustrated example, via embedded network management protocols.

Importantly, the NMM 110 analyzes raw network data, condensing it into a usage model database 115 that describes relationships between network devices. For instance, captured packets representing multiple HTTP protocol connections between a client computer and server are preferably condensed into a single relationship between client and server.

If the totality of all such relationships observed on the network 1 comprises a reasonable subset of all the actual relationships between network devices on the network 1, NMM 110 has inferred a covering "usage model" of the network 1. This usage model 115 is created and stored by the NMM 110. In the preferred embodiment, the NMM 110 periodically maintains and updates the usage model 115 as changes are made to the network 1 or legitimate network usage evolves. With a covering usage model, it is very likely that any legitimate, in-use service on the network is described by the database 115.

Moreover, for communications, especially critical communications, that may occur only infrequently, a network administrator will sometimes manually review the usage model 115 to ensure that the model covers the critical network communications, and if it does not, the administrator will modify the usage model to ensure that the communications are covered by manually adding a relationship between network devices, such as network computers.

The ADS 112 performs analysis to identify attacks such as violations to security policies or behavior that appears to be propagating. Breaches to security policies are detected by detecting unauthorized access to network resources, such as users or network computers trying to access servers, when such users or network computers are not authorized to access those servers. Propagation is detected by observing similar deviant behavior on multiple hosts within a short period of time. "Deviance" in network behavior can be detected using a variety of static methods (comparing current behavior to a known set of pathological behaviors, such as detecting network scans and signatures of known network attacks, for example), or using the NMMs covering usage model 115 as a reference for "normalcy".

The ACDs 114-1, 114-2, 114-4, 114-5 are devices that selectively forward and block traffic. ACD-like devices are in wide deployment on commercial networks today. A typical embodiment of the ACD would be a network firewall. However, the "filtering" capabilities of routers 18 and switches 20-1 and 20-2, or the "filtering" capabilities extant on hosts (such as host firewalls) are also used as ACDs in other implementations.

From the standpoint of network topology, the ACDs are preferably not merely deployed or positioned at the edges of the network 1, such as firewall ACD 114-5. This is the typical way in which firewalls are deployed today.

Instead, the ACDs are further deployed to compartmentalize the user network 1. In some examples, the ACDs are used to isolate potentially infected client computers from the rest of the network. An example of such a deployment is ACD 114-2, which separates client computers 10 of subnet2 from the rest of the network 1. In other examples, the ACDs are deployed to protect mission-critical network devices such as host computers, file servers, and database servers, for example. Examples of such a deployment are ACDs 114-1 and 114-3 that separate the host computers 15, disk array 14, and database servers 12-1, 12-2 of subnet1 and subnet3 from the remainder of the network 1. In still other examples, the ACDs are deployed to protect individual network devices such as document server 16 using ACD 114-4.

In this typical embodiment, the prototypical ACD 114 is a device that manages a collection of "rules" determining which TCP/IP addresses, protocols, and ports are forwarded through the device.

The CP 116 is a system that responds to the detection of an attack as determined by the ADS 112 and then functions to modify the rules applied by the ACDs 114 and other flow control devices such as router 18 or switches 20. The CP 116 receives notifications from the ADS 112 that propagating behavior or other attack has been identified. The CP 116 then asks the NMM 110 for a list of known relationships between network devices that use the same network services as the propagating attack. It combines these two pieces of information to form a recommendation to all ACDs on the network to block traffic.

Preferably, the ACDs also enable retrieval of the list of forwarding rules currently in effect, some of which may be "static", defined permanently by network operators. The CP 116 reads this list and possibly maintains the list in a blocking rule record, which is used to determine a reasonable set of forwarding rules.

The CP 116 also functions as an attack response controller that generates updates to the list of rules, amending it to prevent the forwarding of traffic related to propagating attack traffic.

Figure 2:
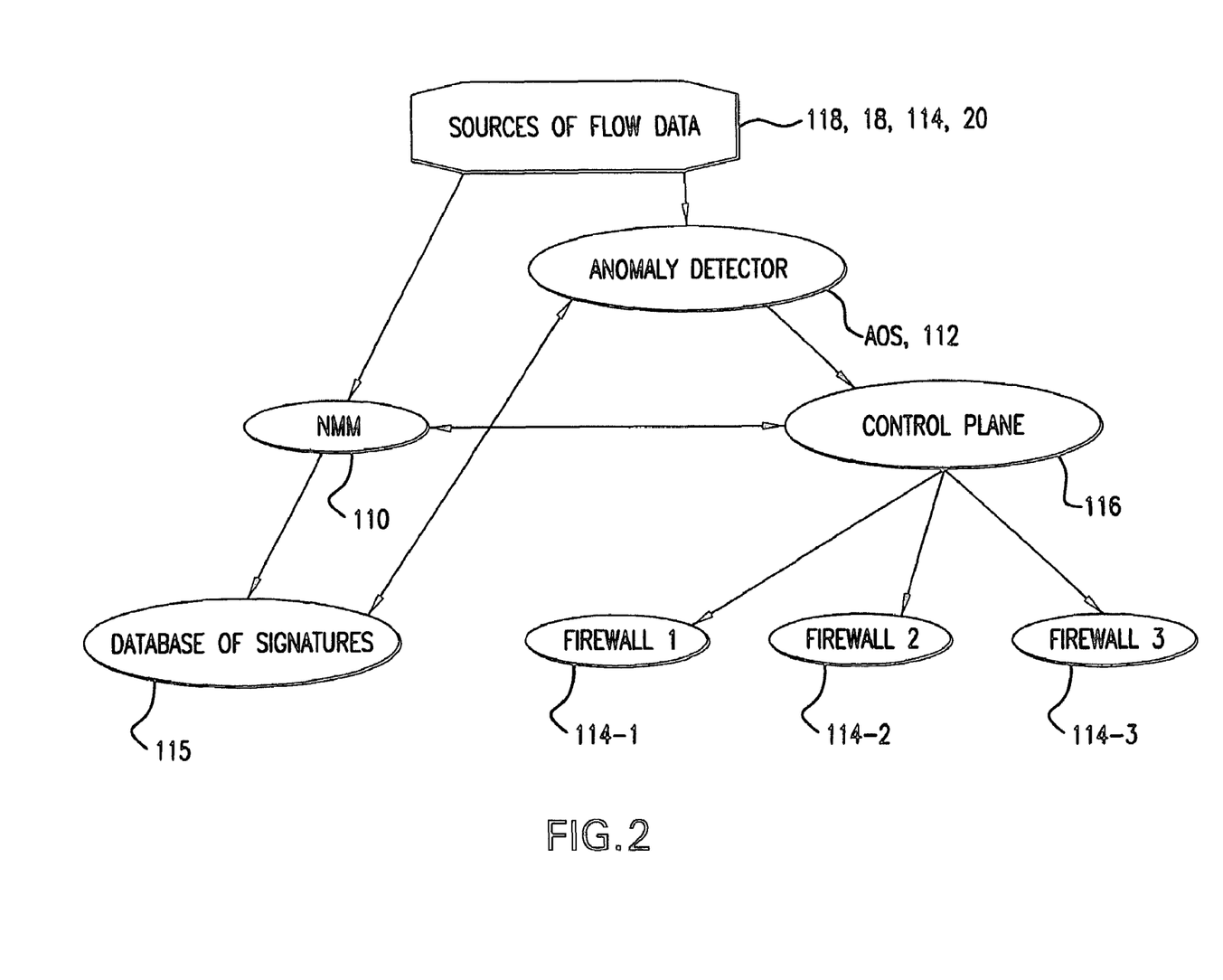
FIG. 2 is a block diagram illustrating the connectivity between the elements of the inventive protection system.

FIG. 2 shows the relationships between the elements of the network protection or control system. Specifically sources of network flow data such as monitoring computers 114, routers 18, switches 20, firewalls 114 provide information concerning legitimate network communications. This is provided to the NMM 110, which constructs the network usage model 115.

This flow information is also used by the ADS 112 to determine whether the network 1 is under attack. The ADS 112 is also notified of possible attack by firewalls 114 or other monitoring devices such as monitoring computers 118 or router 16. If the ADS 112 determines that a network attack is taking place, it communicates to the control plane, which activates or modifies the behavior of the ACD or firewalls 114 to block the attack code while continuing to permit legitimate communications.

Network Modeling

Figure 3:
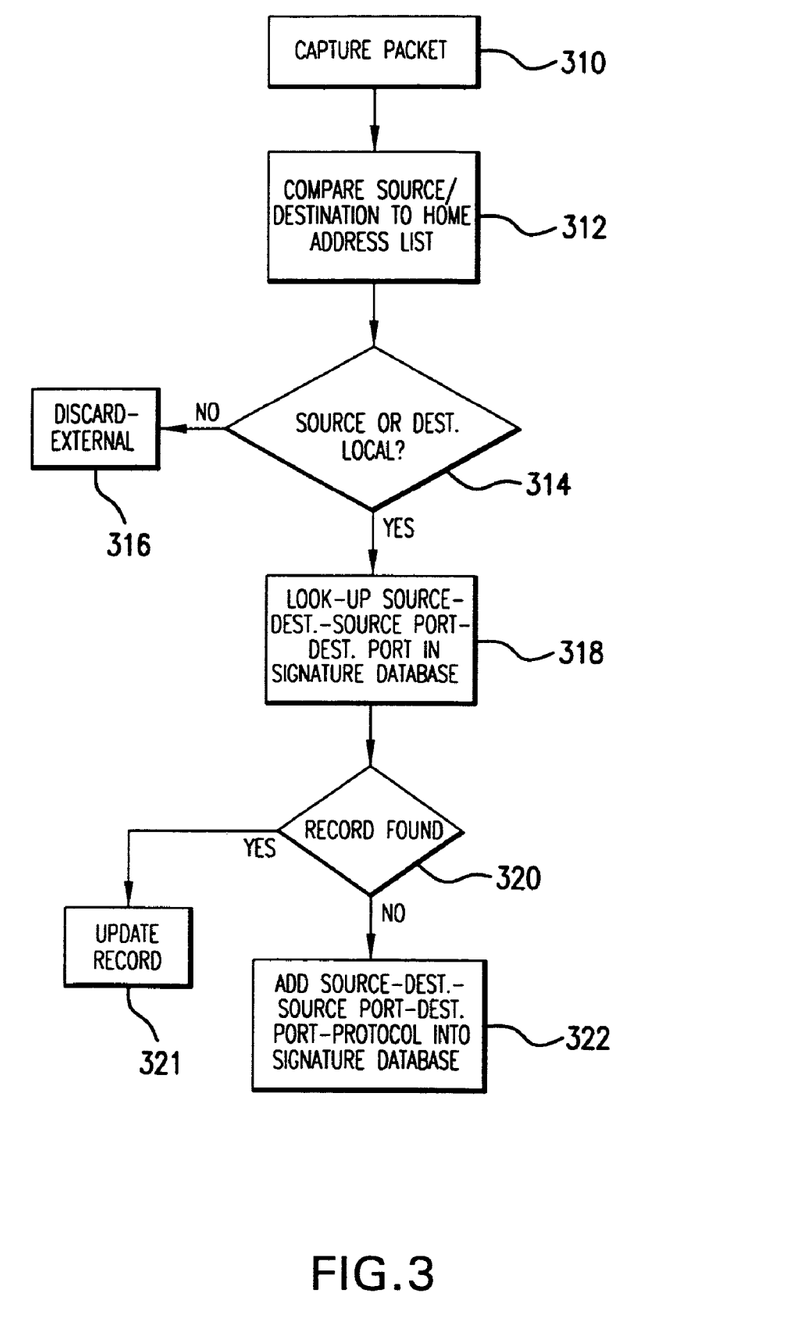
FIG. 3 is a flow diagram illustrating the process of signature generation according to a preferred embodiment.

FIG. 3 shows the process of generating the usage model 115, according to one embodiment. The model 115 of the network 1 is created by collecting flows and generating signature records for all devices, preferably within a specified range or set of IP addresses. The signatures are then stored in a database that functions as the usage model 115.

First, individual packets are captured in the network 1 in step 310. This is accomplished through the monitoring of network communication devices, such as the switches 20-2 or router 18, packets transferred across access control devices such as firewalls 114-1, 114-2, 114-3, 114-4, 114-5, or packets detected by dedicated monitoring computers such as 118-2 or 118-4, for example.

A typical implementation would limit signature generation to a series of "homenets", each of which could be described by an IP range or IP address set covering the network devices of network 1. By discarding flows that have neither a source nor destination address within any configured "homenet", the implementation limits the amount of data that needs to be tracked and stored.

For instance, if a typical large enterprise network is allocated 2"/19" IP address blocks (each containing approximately 8000 usable IP addresses) 1.0.0.0/19 and 2.0.0.0/19, and in addition uses the non-routable "private" IP space 10.0.0.0/8, then the configured homenets for a network modeling system might be:

1.0.0.0/19
2.0.0.0/19
10.0.0.0/8, and any flow that did not bear an address from one of those ranges in either the source or destination address would be discarded as "external".

Specifically, in one example, the signature is generated by comparing the source address and the destination to a home address list in step 312. If it is determined that neither the source address nor the destination address is local in step 314, the packet is not entered into the signature database to form the usage model 115, but discarded in step 316. In another embodiment, the packet is used to update the signature database if only one of the source address and the destination address is local. This results in a larger database, but enables modeling of flows into and out of the network.

By restricting signature generation by IP address, this implementation exploits the fact that there are a limited number of IP devices resident to the network 1, and a limited product of relationships between these devices to track.

Implementation that do not perform such a restriction can either consume all available storage tracking the effectively unlimited set of relationships between resident devices and devices anywhere in the vast space of the InterNet, or else could begin "dropping" old data to make room for more recent data. As described later, permanent storage of signature data is a an important feature of this system.

Next, in step 318, if the packet is determined to be sourced from or destined to a network device within the homenet, the packet's source address, destination address, protocol, source port, destination port combination is compared to the records in the signature database.

A record format for the signature database, in one embodiment, is:

```
CREATE TABLE signatures    (
    source_ip              integer32,
    destination_ip         integer32,
    protocol               integer8,
    source_port                         integer16,
    destination_port                    integer16
);
```

In other embodiments additional fields are provided in the record. For example, a record creation time stamp is provided for the date of the recorded creation. A last-hit time stamp is provided to hold the date when the last time the signature was detected. This allows old signatures to be removed as the network usage and topology evolve and change with time. A hit frequency field is further added in some embodiments. This holds a running average of the frequency this signature arises in the network communication.

In step 320, it is determined whether the combination of the source address, destination address, protocol, source port, destination port is in the signature database. If not, then a new record is created with the source address, destination address, protocol, source port, destination port information in step 322.

If the signature record is present in the database and the database contains the last-hit time stamp and/or hit frequency fields, for example, then these fields are updated in step 321.

If the totality of all recorded signatures comprises a reasonable subset of all the actual relationships on the network, it can be said that the modeling system has inferred a covering "usage model" 115 of the network 1. With a covering usage model, it is very likely that any legitimate, in-use service on the network is described by the database.

The modeling system 110 is called upon to answer queries from the control plane 116 of the form "retrieve all signatures from the database where the source port or destination port is X". In order to optimize the signature database for expected queries, an implementation creates indices on the "source_port" and "destination_port" fields of the table.

Attack Detection

Detection of network attacks is a task well-known to the state of the art in network security. In the preferred embodiment of the present invention, the ADS 112 utilizes a number of different techniques for determining whether an attack against the network 1 is underway.

The most well-known means of detecting network attacks is via "signature detection system". This is the technique used by NIDS.

Figure 4A:
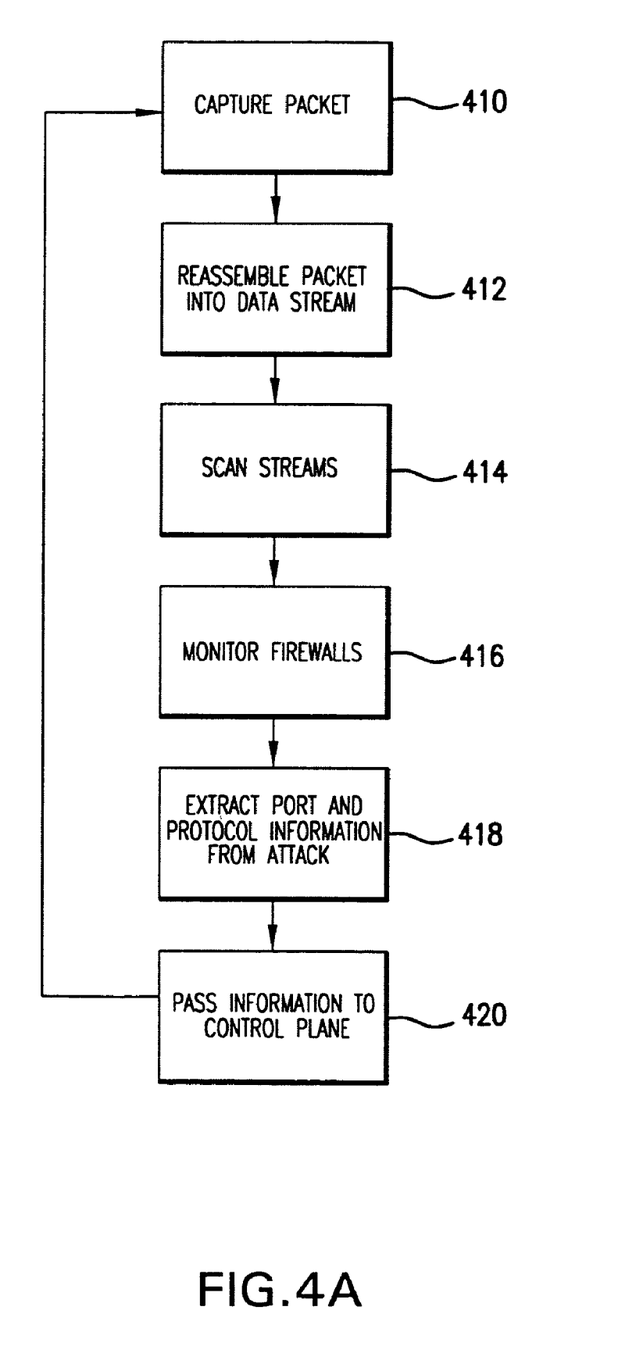
FIGS. 4A and 4B are flow diagrams illustrating two techniques for detecting network attack and generation of information enabling the control plane to formulate a response to the attack.

FIG. 4A illustrates one exemplary process performed by the ADS 112 to detect attack on the network 1.

The ADS 112 captures packets in step 410. Here also the packets are preferably, acquired through the monitoring of network communication devices such as the switches 20-1-20-4 or router 18, collection of packets transferred across access control devices such as firewalls 114-1, 114-2, 114-3, 114-5, or packets detected by dedicated monitoring computers such as monitoring computers 118-2 or 118-4, for example.

The ADS 112 then reassembles the packets into the streams of the data that they are intended to carry in step 412. For instance, the packets are reassembled into the 1) HTML "web page" delivered over an HTTP connection; 2) file transferred over an FTP connection or Windows File Sharing Protocol, 3) message transferred using SMTP; or 4) SQL session.

The ADS then scans the streams in step 414 using pattern matching algorithms to look for telltale patterns of network attacks.

In step 416, the ADS 112 also monitors devices such as firewalls that also are capable of monitoring data streams for data patterns characteristic of attacks. For example, network intrusion detection systems are available on the InterNet. The most well-known example would be the "Snort" system, available at http://www.snort.org.

When implemented using signature detection systems such as Snort, indication of attacks that need to be blocked are drawn from the alerts generated by the signature detection system.

In any event, when the attack is detected, the network TCP or UDP ports and IP protocol information is extracted from the alerts in step 418 and made available to the control plane 116 in step 420.

A class of network attacks exists that is not detected by signature detection systems such as Snort. These attacks are termed "novel", by nature of the fact that attackers exploit them before they are published or made known to implementors of security systems. Without prior knowledge of an attack, it is not always possible to craft a pattern to match network data streams against; novel attacks thus evade detection by signature detection systems.

The preferred embodiment of the inventive system utilizes heuristic attack modeling to confront novel attacks. Heuristic attack modeling examines network traffic for high-level patterns of activity that are generally indicative of network attacks. Where a signature detection system might look for a string of text corresponding to known software vulnerabilities, a heuristic modeling system looks for the pattern of connections typical of a successful or in-progress attack.

Figure 4B:
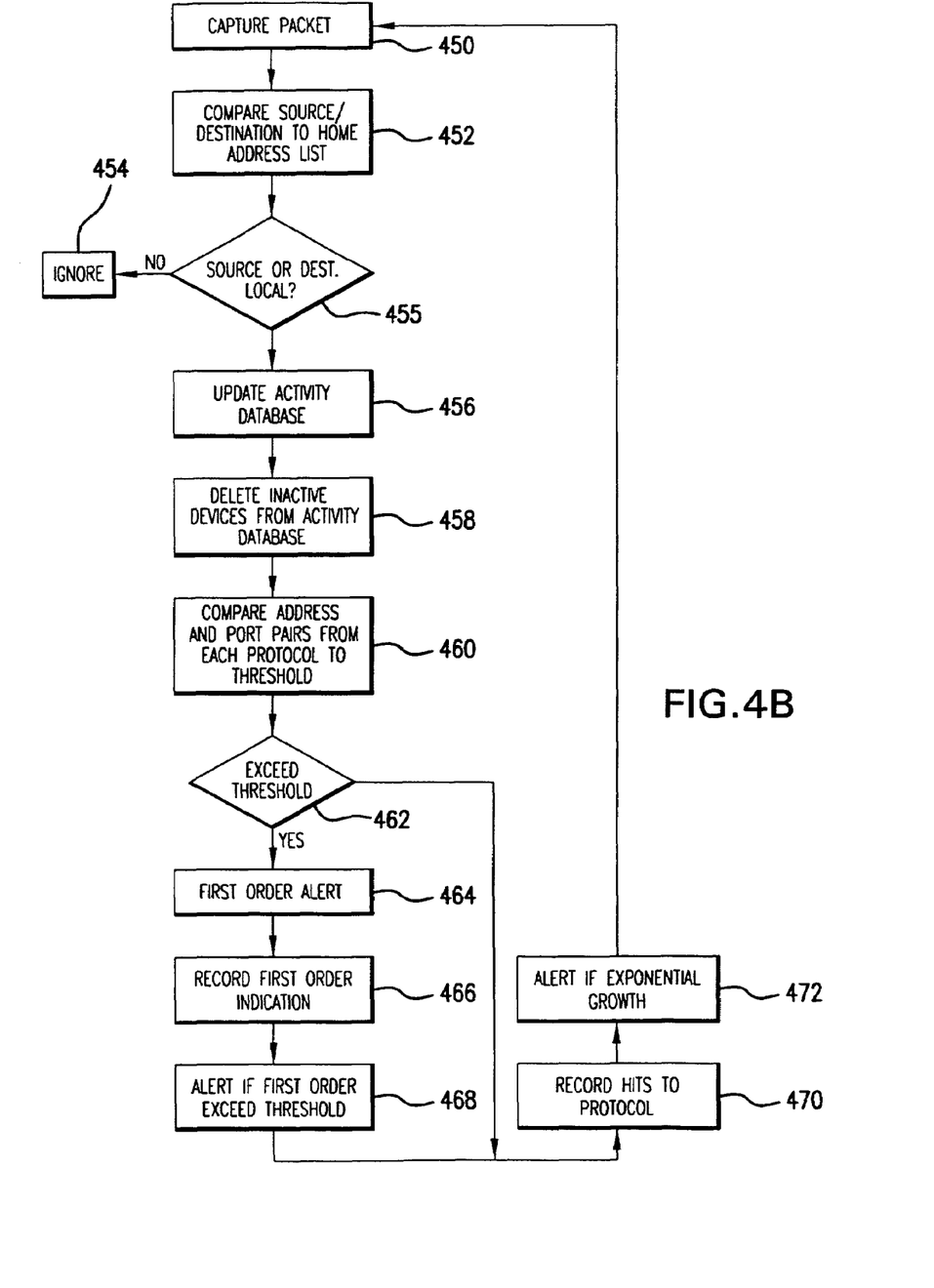

FIG. 4B illustrates another process performed by the ADS 112. This process is used to confront propagating attack code, especially in the case of novel attacks.

Generally, the ADS 112 exploits the increasing velocity of connections that occurs when an infected device scans the network for other vulnerable devices. This scanning behavior is a general pattern of all propagating attacks, not an idiosyncrasy of an individual propagating attack. This technique is therefore effective in detecting a large class of novel attacks, regardless of the vulnerabilities they exploit.

As was the case with the network modeling system 110, the attack detection system 112 depends on monitoring the network usage of all devices within a configured range of addresses, by examining network flows that originate or terminate at an address in one of those ranges.

Specifically, in step 450, the ADS captures packets. Here again the packets are preferably acquired through the monitoring of network communication devices such as the switches 20-1-20-4 or router 18, packets transferred across access control devices such as firewalls 114-1, 114-3, 114-5, or packets detected by dedicated monitoring computers such as 118-2 or 118-4, for example.

The source address and the destination address are compared to the home address list in step 452. If it is determined that neither the source address nor the destination address is local, the communication is ignored in step 454.

If the packet is local, the ADS 112 adds information from the packet to an activity database, in step 456. The activity database has a record for each network device in the homenet address range. The activity database records the number of flows per second from each active device. Active devices are detected by observing the source addresses of network flows. For each active device, any active network protocols are also detected by observing the protocol and destination port of network flows and these active network protocols are also recorded in the active device's record in the activity database.

In another embodiment, the ADS 112 detects and monitors contemporaneous network activity and compares the activity to the historical record provided by the usage model 115. The ADS signals an attack in response to high rates of change or signaled changes in the usage model, especially when those rates of change are associated with one or a few protocols.

In still other cases, the ADS 112 accesses the usage model so that legitimate scans of the network do not trigger an attack response.

During each one-minute period, a record is created for every active network protocol detected. Within each of these records is recorded the set of all destination address and port tuples present in flows originating from the record's source address. Network devices that exhibit inactivity are deleted from the database in step 458.

Then, in step 460, the number of destination address and port tuples recorded for each active network protocol is compared to a static threshold. If the number of destination address and port tuples recorded for any active network protocol exceeds the threshold as determined in step 462, a "first-order" indication of a propagating attack is signaled in step 464. First-order indications are low-confidence alerts of propagating attacks, and can be used directly by the control plane 116 as a signal to block traffic.

As first-order indications are created, they are recorded in a separate set of records, organized by network protocol and port in step 466. For example, all first-order indications that correspond to the HTTP protocol (by protocol [TCP] and port [80]) are recorded in a single record.

If, at any time, the number of first-order indications for a single one of these records exceeds a static threshold, a "second-order" indication of a propagating attack is signaled in step 468. Second-order indications are higher-confidence alerts of propagating attacks, and can be used directly by the rest of our system to block traffic.

Finally, the system records the number of "hits" any network protocol receives over time in step 470. Records are created for every active network protocol detected on the network, regardless of source address; for example, all network connections that correspond to the HTTP protocol (by protocol [TCP] and port [80]) would be described by a single record. Each record counts the number of times in a one-minute period that the protocol was observed in network flows. In another embodiment, a record is kept for each unique combination of protocol and port.

At the end of each one-minute interval, the sum of all connections is saved in a rolling window of one or two or more hours worth of one-minute observations. At this time, the rolling window is tested to see if the number of connections has grown exponentially over time. If an exponential growth of connections is observed over multiple one-minute observations, a first-order indication of a propagating attack is signaled in step 472.

Network Access Control

The ACDs 114 are used to selectively forward network packets to control access to the network 1. Commercially-available and open-source systems exist that have this functionality. An exemplary implementation of the ACD 114 is a network firewall, as embodied in systems such as the Checkpoint Firewall-1 product, or the pf packet filtering system.

Generally, any network access control system can be harnessed as an ACD 114 as long as it allows packets to be forwarded selectively by destination port and/or protocol, and allows "exceptions" to blocking rules for specific hosts.

In the preferred embodiment the inventive system uses the OpenBSD pf packet filtering system but other access control systems would be compatible if it supported an analog of the rules:

1) pass in proto tcp from any to 1.2.3.4/32 port=80
2) pass in proto tcp from 1.2.3.4/32 port=80 to any
3) block in proto tcp from any to any port=80

In more detail, the ACD operates on a given packet by apply each of the rules 1)-3) in series. Applying rule 1), the packet is passed through the ACD if it involves TCP protocol and it is destined for IP address 1.2.4.4/32 on port 80. If the packet does not satisfy rule 1), rule 2) is applied. Here the packet is passed through the ACD if it involves TCP protocol and it is sourced from for IP address 1.2.4.4/32 on port 80. Finally, if the packet does not satisfy rule 2), rule 3) is applied, in which the packet is blocked if it involves the TCP protocol, regardless of source or destination address.

This rule set would be generated in response to an attack involving the TCP protocol on port 80. However, a web server at address 1.2.3.4/32 could continue to operate since communications to it were specifically allowed by the pass rules.

Control Plane

Figure 5:
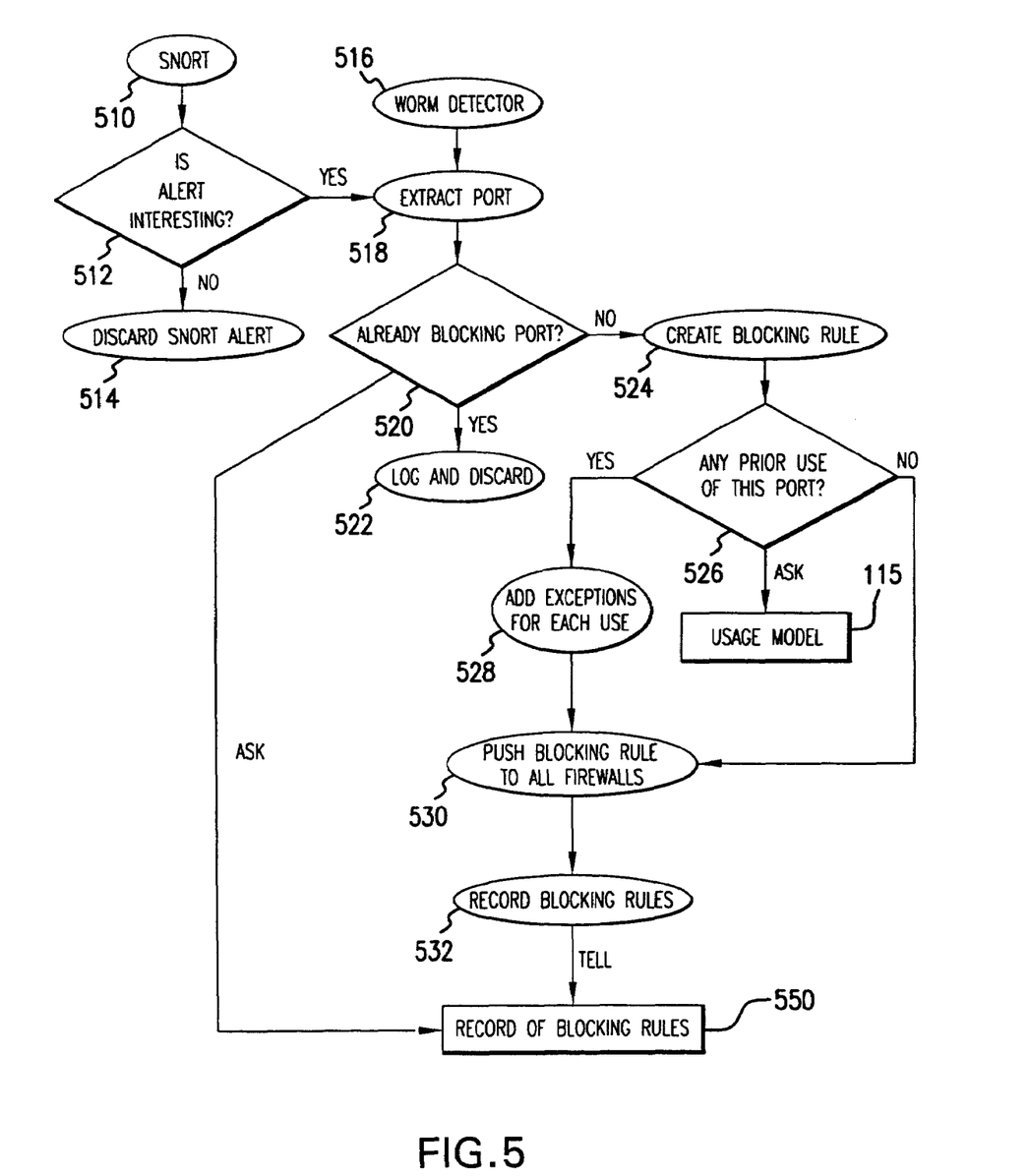
FIG. 5 is a flow diagram illustrating the operation of the control plane and specifically the generation of blocking rules to the access control devices, according to the present invention.

The inventive system blocks network attacks by generating access control rules tailored both to the details of a network attack generated by the ADS 112 and the modeled behavior of the network by the NMM 110. The kernel of this system is the control plane 116, which ties information from an attack detection system 112 and a network modeling system 110 and feeds it to the system of network access control devices 114 that compartmentalize the protected network FIG. 5 illustrates the operation of the control plane 116.

The control plane 116 is driven by indications of network attacks. These indications in the typical embodiment are signaled by the ADS 112. One source is the process of signature detection as illustrated in FIG. 4A as might be generated by Snort in step 510.

The control plane in step 512 determines whether the alert is interesting or simply a false-positive indication of attack. In such case, it is discarded in step 514.

Worm attack are detected in one example with the process described relative to FIG. 4B, which illustrates a process is used to confront propagating attack code, especially in the case of novel attacks, in step 516.

In the case of an attack, such as from worms, the control plane 116 additionally acquires the protocol and destination port of the attack in step 518.

In step 520, the control plate 116 queries the record of blocking rules currently being applied by the ACDs 114. This step in one example is performed by contacting the ACDs and downloading their respective current rules. In another example, these rules have been previously aggregated in a blocking rule record 550, which the control plate 116 accesses and maintains.

If the port of the attack is already being blocked, then the alert is logged and discarded in step 522. However, if the port is not being blocked, a blocking rule is created in step 524. This created rule blocks the port and protocol that the attack is exploiting.

However, given the protocol/port pair extracted from attack indications, the control plane 116 further queries the usage model 115 to isolate the normal network activity corresponding to protocol/port pair in step 526.

For example, assuming an HTTP attack indication and the record format described previously for the usage model 115, the control plane might generate a query of the form:

```
SELECT          source_address
    FROM        signatures
        WHERE       source_port = 80
    AND         protocol = 6
and a query of the form:
SELECT          destination_address
    FROM        signatures
        WHERE       destination_port = 80
    AND         protocol = 6
```

The results of these queries are the addresses of all devices known to serve HTTP on the network. Thus, the control plane first determines the addresses or hosts on the network that normally or legitimately operate on the protocol and port that the detected attack is exploiting.

Continuing with this HTTP attack example, the network modeling system 110 has modeled the following addresses serving HTTP and stored those addresses in the usage model 115:

1.2.3.4
2.3.4.5
3.4.5.6
4.5.6.7

These legitimate hosts for the protocol and ports are used to create the exceptions to the blocking rule.

In one embodiment, the recent additions to the usage model are not used to create the exceptions. For example, exceptions are not created for usage model entries in which the creation time stamp is recent, such as less then 24 hours old. This ensures that the attack response is not skewed by network behavior that was modeled by the network modeler 110 but initiated by the attack.

The control plane system 116 is coupled to a plurality of access control devices 114. For instance, a typical deployment of the system could be connected to ACD 114-1-114-5, such as OpenBSD pf packet filtering devices deployed across the network. Given this information, a control plane 116 driving these OpenBSD pf packet filters would generate the following filter rule set:

pass in quick proto tcp from 1.2.3.4 port=80 to any
pass in quick proto tcp from 2.3.4.5 port=80 to any pass in quick proto tcp from 3.4.5.6 port=80 to any
pass in quick proto tcp from 4.5.6.7 port=80 to any
block in quick proto tcp from any to any port=80

This rule set would be added to the rulesets of each of the ACD packet filters in step 530. Further, the new blocking rules are recorded in step 532 and specifically used to update the blocking rule record 550.

This rule set includes the blocking rule generated in step 524, which stops communication on the port and protocol exploited by the attack. Packets on this port/protocol pair, however, will be blocked only if they are not sourced form the addresses 1.2.3.4, 2.3.4.5, 3.4.5.6, or 4.5.6.7 because of the pass rules that are applied before the blocking rule. Further packets using other ports or protocols satisfy none of the rules and are therefore passed.

Thus, the control plane 116 is able to actuate the ACDs to block the network attack while ensuring the legitimate network communication, which was established by previous modeling of the network, is passed by the ACDs.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for controlling communications over a computer network, the system comprising:
    access control devices for the computer network that control communications between compartments of the computer network;
    attack detection system for determining whether the computer network may be under attack; and
    a control plane for instructing the access control devices to allow network communications between the compartments of the computer network based on a usage model describing legitimate network communications while restricting other network communications between the compartments, in response to attack.

2. A system as claimed in claim 1, wherein the computer network is an enterprise network.

3. A system as claimed in claim 1, wherein the computer network is a service provider network.

4. A system as claimed in claim 1, wherein the computer network is a public network.

5. A system as claimed in claim 1, wherein the access control devices compartmentalize the computer network into separate sub-networks of network devices.

6. A system as claimed in claim 1, wherein the access control devices separate host computers from the computer network.

7. A system as claimed in claim 1, further comprising a network modeling system for generating the usage model.

8. A system as claimed in claim 7, wherein the network modeling system receives flow information describing communications between network devices.

9. A system as claimed in claim 8, wherein the flow information is collected by network communications devices.

10. A system as claimed in claim 8, wherein the flow information is collected by the access control devices.

11. A system as claimed in claim 8, wherein the network modeling system discards flow information between network devices in the computer network and network devices external to the computer network.

12. A system as claimed in claim 7, wherein the network modeling system compares new network communications to the usage model and updates the usage model if the new network communications are not described by the usage model.

13. A system as claimed in claim 1, wherein entries in the usage model comprise source addresses, destination addresses, source ports, and destination ports derived from the network communications.

14. A system as claimed in claim 1, wherein entries in the usage model comprise source addresses, destination addresses, source ports, and destination ports derived from the network communications in addition to time stamp information indicating when the network communication was last detected.

15. A system as claimed in claim 1, wherein entries in the usage model comprise source addresses, destination addresses, source ports, and destination ports derived from the network communications in addition to frequency information indicating a frequency of the network communication.

16. A system as claimed in claim 1, wherein the attack detection system monitors communications over the computer network for attack using signature detection.

17. A system as claimed in claim 1, wherein the attack detection system performs heuristic modeling to determine whether the computer network is under attack.

18. A system as claimed in claim 1, wherein the attack detection system monitors communications over the computer network for attack by monitoring changes in connections between network devices.

19. A system as claimed in claim 1, wherein the control plane receives protocol information and/or port information characteristic of the attack and generates pass and/or blocking rules for the access control devices.

20. A system as claimed in claim 1, wherein the control plane receives protocol information and/or port information characteristic of the attack and generates pass rules and blocking rules for the access control devices, in which the pass rules are generated from the usage model and the blocking rules are generated from the protocol information and/or port information characteristic of the attack.

21. A method for responding to an attack on a computer network, the method comprising:
    generating a usage model for the computer network;
    determining whether the computer network may be under attack;
    in response to detecting attack, determining characteristics of the attack; and
    generating instructions to access control devices compartmentalizing the computer network in response to the characteristics of the attack, wherein the step of generating instructions to the access control devices comprises formulating pass and/or blocking rules for the access control devices in response to protocol characteristics and/or port characteristic of the attack;
    issuing the instructions to the access control device which then compartmentalize the computer network by implementing the pass and/or blocking rules.

22. A method as claimed in claim 21, wherein the step of generating the usage model comprises saving records describing network communications to and from network devices on the computer network.

23. A method as claimed in claim 21, wherein the step of generating the usage model comprises saving records describing network communications between network devices on the computer network.

24. A method as claimed in claim 21, wherein the step of generating the usage model comprises saving records that include port, protocol, source address and destination address of network communications to and from network devices on the computer network.

25. A method as claimed in claim 21, further comprising the step of the access control device compartmentalizing the computer network into separate sub-networks of network devices.

26. A method as claimed in claim 21, further comprising the step of the access control device compartmentalizing the computer network by separating host computers from the computer network.

27. A method as claimed in claim 21, wherein the step of generating a usage model comprises:
  collecting flow information at network communications devices; and
  passing the flow information to a network modeling system.

28. A method as claimed in claim 27, wherein the step of collecting flow information is performed by the access control devices.

29. A method as claimed in claim 21, wherein the step of generating a usage model comprises comparing network communications to the usage model and updating the usage model if the network communications are not described by the usage model.

30. A method as claimed in claim 21, wherein the step of determining whether the computer network may be under attack comprises monitoring network communications for attack signatures.

31. A method as claimed in claim 21, wherein the step of determining whether the computer network may be under attack comprises performing heuristic modeling to determine whether the computer network is under attack.

32. A method as claimed in claim 21, wherein the step of determining whether the computer network may be under attack comprises monitoring changes in connections between network devices.

33. A method as claimed in claim 21, wherein the step of generating instructions to the access control devices comprises generating pass rules and blocking rules for the access control devices, in which the pass rules are generated from the usage model and the blocking rules are generated from protocol and/or port characteristics of the attack.

34. A system for controlling communications over a computer network, the system comprising:
  access control devices for the computer network that control communications between compartments of the computer network;
  attack detection system for determining whether the computer network may be under attack; and
  a control plane for instructing the access control devices to only allow network communications between the host computers in different compartments of the computer network based on a usage model describing legitimate network communications while restricting all other network communications between the host computers, in response to attack.

* * * * *